United States Patent [19]
Clark

[11] 3,863,258
[45] Jan. 28, 1975

[54] BINARY BEAM SYSTEM

[75] Inventor: William H. Clark, College Park, Md.

[73] Assignee: Litton Systems, Inc., College Park, Md.

[22] Filed: June 28, 1973

[21] Appl. No.: 374,366

Related U.S. Application Data

[63] Continuation of Ser. No. 180,359, Sept. 14, 1971, abandoned.

[52] U.S. Cl. .......................... 343/113 R, 324/83 D
[51] Int. Cl. ............................................... G01s 3/46
[58] Field of Search ................ 343/113 R; 324/13 D

[56] References Cited
UNITED STATES PATENTS

| | | |
|---|---|---|
| 3,025,514 | 3/1962 | Alexander et al............... 343/113 R |
| 3,175,217 | 3/1965 | Kaiser, Jr. et al................ 343/113 R |
| 3,540,053 | 11/1970 | Sparagna et al. ................ 343/113 R |

Primary Examiner—Maynard R. Wilbur
Assistant Examiner—Richard E. Berger
Attorney, Agent, or Firm—Alfred B. Levine; Alan C. Rose

[57] ABSTRACT

An interferometric direction finder system for radio waves employing unique logic using the phase difference between signals received by one or more pairs of antennas to generate a multiple digital code representing direction. A preferred implementation employs product detectors for deriving the sum and difference signals, used for unique encoding.

7 Claims, 11 Drawing Figures

INVENTOR
WILLIAM H. CLARK

BY Alfred B. Levine
ATTORNEY

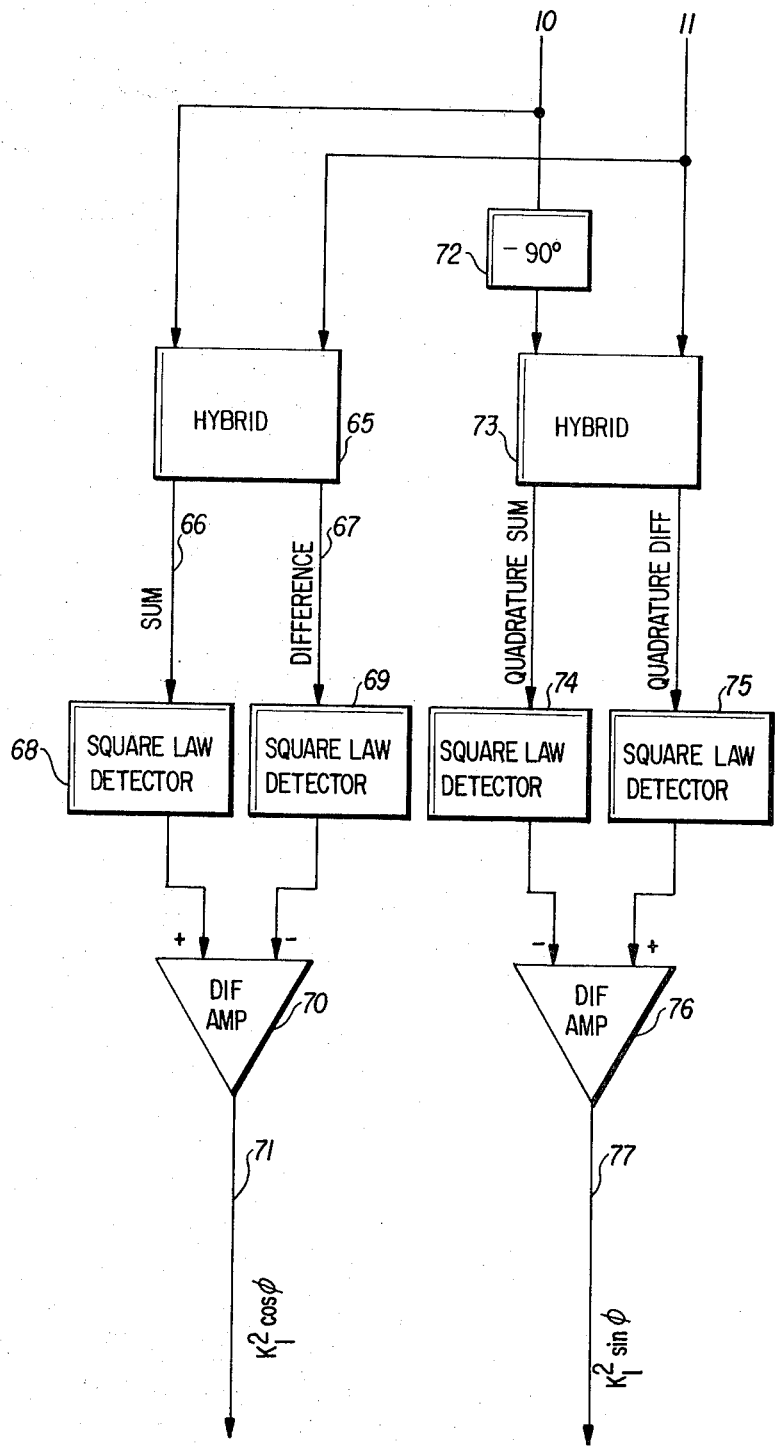
FIG. 3 SUM-DIFFERENCE CIRCUITRY

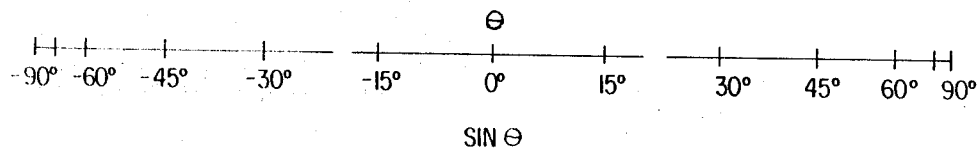
FIG. 4a
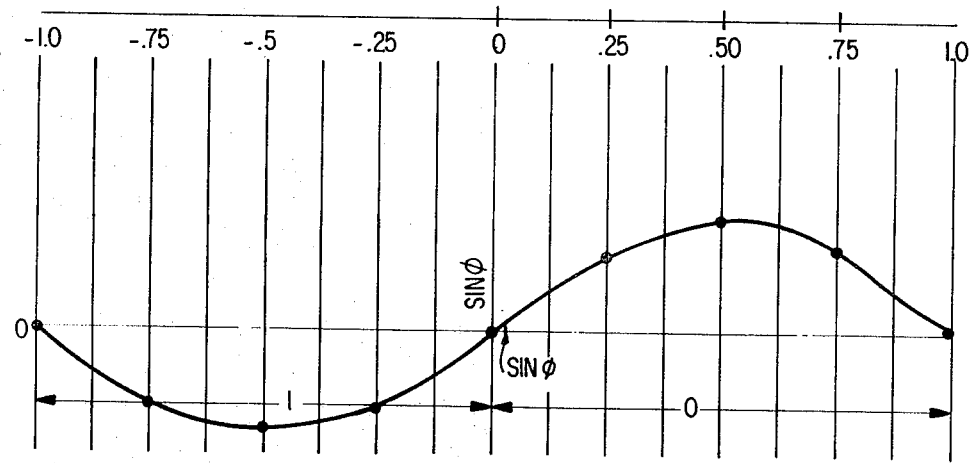
FIG. 4b
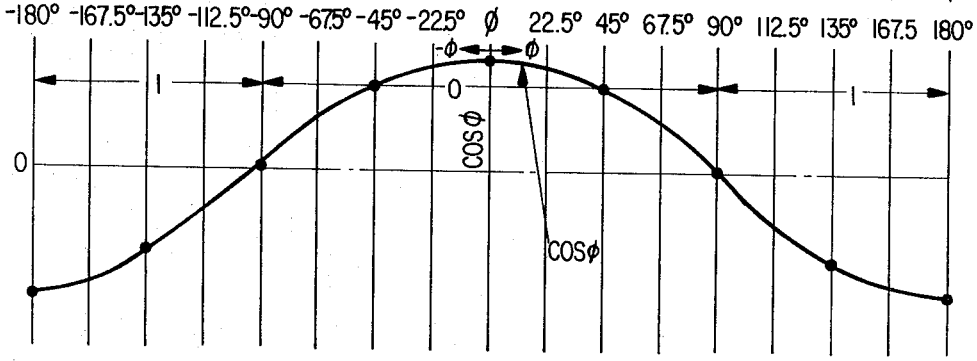
FIG. 4c — 3rd Digit 1 if |SINφ| > |COSφ|
FIG. 4d — 4th Digit 1 if 3rd Digit 0 and |SINφ| > SIN 22.5°
FIG. 4e — 4th Digit 1 if 3rd Digit 1 and |COSφ| > SIN 22.5°

BINARY BEAM SYSTEM

This is a continuation of application Ser. No. 180,359, filed Sept. 14, 1971, now abandoned.

STATEMENT OF THE INVENTION AND BACKGROUND

This invention relates to digitally operating direction locating systems for radio waves employing one or more pairs of spaced apart fixed antennas and digital logic means for resolving the direction of the incoming wave.

In an earlier application of Charles Fink et al., assigned to the same Assignee, U.S. Pat. No. 3,631,496, there is provided an interferometric system for determining the spatial direction of an incoming radio wave employing one or more pairs or antennas and a digital processing means for successively resolving the direction of the wave within progressively narrower spatial sectors. The process employed uses digital amplitude comparison of phase displaced signals received from different antennas to determine direction and to resolve ambiguities.

SUMMARY OF THE PRESENT INVENTION

Generally according to the present invention, the digital signals representing the directional code are derived by employing both the amplitude and the polarity of processed signals obtained from one or more pairs of displaced antennas, or from antennas paired with a common or reference antenna. These processed signals are a function of the sine and cosine of the time phase relationship of signals received by a pair of antennas, which in turn, are a function of the space angle. A multi-digit code is developed from these sine and cosine signals utilizing the polarity of both signals; a comparison of absolute amplitudes of the signals; and a comparison of each of these signals referenced to fixed amplitude signals.

BRIEF DESCRIPTION OF THE DRAWING

FIG. 3 is an electrical block diagram of circuitry for producing the processed sine and cosine signals, FIGS. 4a, 4b, 4c, 4d, and 4e, are waveform and logic diagrams for use in illustrating the production of the digital code.

DETAILED DESCRIPTION OF A PREFERRED EMBODIMENT

Figure 1:
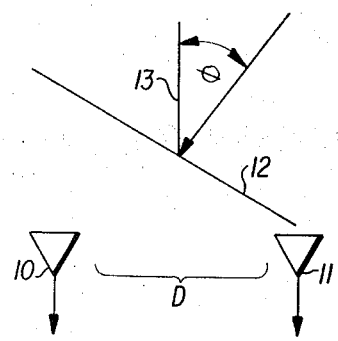
FIG. 1 is a diagramatic view of a pair of spaced antennas and an incoming radio wave.

Referring to the drawings, there is shown in FIG. 1 the spatial relationship existing between an incoming radio wave having a wavefront 12 referenced to a pair of spaced antennas 10 and 11 spaced apart a distance D. Where the wavefront 12 is received at a spatial angle $\theta$, referenced to the boresight of the antennas, the signal received by antenna 10 is phase delayed by an angle $\phi$ referenced to the signal received by antenna 11. This phase delay is shown to be in proportion to the spatial angle $\theta$ of the incoming wave in the following known interferometric relationship:

$$\theta = 360° \, D/\lambda \, . \, \text{sine } \theta$$

where $\phi$ is the phase delay,

D is the distance between antennas, $\lambda$ is the wavelength at the frequency involved, and $\theta$ is the space angle of the incoming radio wave This interferometric formula illustrates that the spatial direction or space angle $\theta$ of the incoming wave 12 is determinable by measuring the phase difference $\phi$ between signals produced by the pair of displaced antenna elements, and that the extent the phase delay is also directly proportional to the distance or spacing between the antennas.

Figure 2:
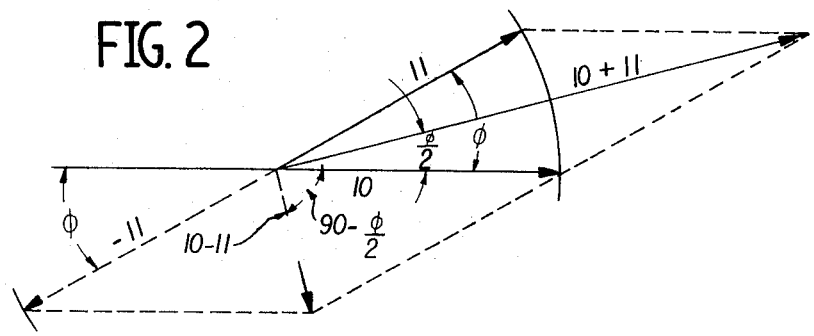
FIG. 2 is a vector diagram illustrating the phase relationship of the received antenna signals and of the sum and difference signals thereof.

The phase displaced signals received by antennas 10 and 11 may be conventionally represented by vectors 10 and 11 in FIG. 2; and as there shown, the sum of such signals is a third phase displaced signal whose amplitude and time phase varies according to the phase delay between vectors 10 and 11; and whose vector difference is a fourth phase displaced signal that also changes in both amplitude and phase angle according to the phase difference between the signals from antenna elements 10 and 11.

According to the present invention, it can be shown that a signal resulting from subtracting the squared vector sum signal from the squared vector difference signal is proportional to the cosine of the phase displacement $\phi$ that it is desired to determine, e.g., $$K_1^2 \, (E^2_{sum} - E^2_{difference}) = K_1^2 \cos \phi$$

where $K_1$ is a constant quantity, and $\phi$ is the phase angle.

Additionally it can be shown, that a vector signal resulting from subtracting these squared signals, where one of the antenna signals is fixedly phase shifted by 90°, is proportional to the sine of the phase displacement $\phi$ as follows:

$$K_1^2 \, (E2_{qs} - E2_{qd}) = K_1^2 \sin \phi$$

where $K_1$ is a constant, and $\phi$ is the phase angle where $qs$ is the quadrature sum and $qd$ is the quadrature difference.

Since each of these difference signals is a function of the phase delay $\phi$ between antennas 10 and 11, each difference signal is therefore also proportional to the space angle $\theta$ that it is desired to determine.

According to the present invention, the spatial direction or angle $\theta$ of the incoming wave is determined by digitally processing these two squared sum minus difference signals obtained from each pair of antennas.

In a preferred embodiment it is desired to determine the direction of space angle $\theta$ of the incoming radio wave 12 over a range of 90 spatial degrees of each side of boresight. Over this range of angles, the squared sum minus squared difference signal (cos $\phi$) varies as the cosine function as illustrated by the waveform in FIG. 4b. Thus where the phase delay $\phi$ is 0°, and the radio wave is approaching the antennas at a space angle $\theta$ of 0° in space (at boresight), the cos $\phi$ signal is at maximum amplitude. On the other hand where the phase delay $\phi$ is at 90°, then the cos $\phi$ signal is at a minimum or zero as shown. This occurs at a space angle where sin $\theta$ equals ½ (for antennas spaced ½ wave length apart) or at a space angle of 30° from boresight. Similarly where the phase delay $\phi$ is 180°, then the cos $\phi$ signal is at a minus maximum amplitude as shown. This occurs at a incoming space angle of $\theta$ of 90°, where sin $\theta$ equals 1, and the phase angle $\phi$ equals 360° × ½ × 1 equals 180°.

Thus it is seen from FIG. 4b that the amplitude of the cos $\phi$ signal provides desired information concerning the spatial direction $\theta$ of the incoming wave.

In a similar manner where one of the antenna signals is fixedly phase shifted by 90°, then the quadrature difference signal varies as a sine wave proportional to the spatial direction of the incoming radio wave 12, as illustrated in FIG. 4a, and is phase displaced by 90° from the sum minus difference signal of FIG. 4b.

According to the present invention, the amplitudes and polarities of these two derived signals shown in FIGS. 4a are digitally processed to determine the spatial direction of $\theta$ of the incoming wave 12 and produce a multibit digital code representing this space angle $\theta$.

The polarity of the sin $\phi$ signal (FIG. 4a) is employed to produce the most significant digit of the code to generate a 0 bit whenever this signal is positive and a 1 bit whenever it is negative. Referring to FIG. 4a, it is observed that when wave 12 is received in the space sector where $\theta$ ranges from 0° to 90° from boresight, then the sin $\phi$ signal is positive, and the most significant bit of the code is 0 whereas when the radio wave 12 is received from the opposite side of boresight or from 0° to −90° in space, then the sin signal is negative and the first bit produced is 1.

It is also seen from FIG. 4b, that the polarity of the cos $\phi$ signal is positive over the range of space angles where sin $\theta$ equals 0 to ½, and also over the range where sin $\theta$ equals 0 to minus ½ (space angles $\theta$ of 0° to 30°, and 0° to −30°). Therefore a second digit of the code represented as 0 is produced whenever the cos $\phi$ signal (FIG. 4b) is positive, representing that the space wave is received in the wide spatial sector from 0° to 30° from boresight in either direction. On the other hand whenever the cos $\phi$ signal is negative, a different digit or bit 1 is produced, signifying that the incoming wave is received in the space sector from sin $\theta$ equals ½ to sin $\theta$ equals 1 (space angles of from 30° to 90° from boresight in either direction). Thus using only the positive or negative polarity of the cos $\phi$ signal above, a second digit of the code is produced that locates the space direction of the wave in a broad angular sector.

Thus employing merely the polarity of the cos $\phi$ and sin $\phi$ signals to produce the first two digits of the code, the angular direction of the incoming wave can be determined in broad space sectors without ambiguity as follows:

| Space Sector $\theta$ | Code |
| --- | --- |
| 0 to 30° | 00 |
| 30° to 90° | 01 |
| 0 to −30° (opposite boresight) | 10 |
| −30° to −90 (opposite boresight) | 11 |

The remaining portion of the system is employed for the purpose of successively identifying the incoming space direction of the radio wave 12 within progressively narrower angular sectors in space and generating further digits of the code each representing such narrower space sector.

To produce the third bit or digit, the absolute amplitudes of the cosine signal and of the sine signals are compared, and where the cosine signal exceeds the sine signal, a 0 bit is produced and where the reverse condition prevails a 1 bit is produced. Referring to FIG. 4c, it is noted that over the narrower space sector from sin $\theta$ of 0° to sin $\theta$ of ¼ (space angle $\theta$ of 0° to about 14½°), the cosine signal is greater than the sine signal to produce a 0; and from sin $\theta$ of ¼ to sine $\theta$ of ½ (space angle $\theta$ sector from about 14½° to about 30°) the opposite prevails.

Thus it is seen that the third digit of the code obtained by comparing the amplitudes of the cos and sin signals successively identifies or resolves the angular direction of the incoming wave within a narrower space sector than the first and second digits as shown by the following tabulation.

| Space Sector ($\theta$) | Code |
| --- | --- |
| 0 to 14½° degrees | 000 |
| 14½ to 30° degrees | 001 |
| 30° to 44½° degrees | 011 |
| 44½ to 90° degrees | 010 |
| 0° to −14½ degrees | 100 |
| −14½ to −30° degrees | 101 |
| −30° to −44½° degrees | 111 |
| −44½° to −90° degrees | 110 |

The above tabulation illustrates that the three digit code resolves the direction of the incoming wave within a 15° spatial sector over the range of 0° to about 45° from boresight in either direction and thence within a 42° spatial sector from a 48° space angle direction to the ninety degree space angle.

To resolve the wave within an even smaller or narrower space sector, a fourth bit of the code is produced by comparing the amplitude of the sine $\phi$ signal with a fixed reference amplitude.

Returning to FIG. 4a, it is observed that whenever the third bit or digit is 0 (from space angles of about 0° to 14½° then in that space sector, the amplitude of the sine signal varies between an amplitude of 0 to an amplitude of about 0.7 of its maximum amplitude, and that this variation in amplitude occurs over a phase angle of about 45° ($\phi$). Therefore to derive the next digit of the code and further resolve the spatial direction of the incoming wave, the amplitude of the sine signal is compared with a fixed amplitude signal proportional to sin 22½° ($\phi$). Where the sine signal is less than this reference signal, then a 0 bit is produced and where this sine signal exceeds this reference signal then a 1 bit is produced. Thus where the fourth bit of the code is a 0, then it is known that the incoming radio wave is received in the first half of the previous space quadrant, and if the digit produced is a 1, it is known that the wave is received in the second half (100 >22½°) of the previous space quadrant. This code is illustrated in FIG. 4d and may be represented by the following logic:

$$\cos \phi > \sin \phi \text{ and}$$

$$|K_1^2 \sin \phi| < K_1^2 \sin 22\ 1/2° \text{ then } 0$$

$$|K_1 \sin \phi| > K_1^2 \sin 22\ 1/2° \text{ then } 1$$

In a similar manner it is seen from FIGS. 4b and 4c that whenever the third bit is a 1, the amplitude of the cos signal (FIG. 4b) varies in that space quadrant from an amplitude of 0 to an amplitude of about 0.7 of the maximum amplitude of the wave. Accordingly, to resolve the directional angle of the wave within this 45° phase quadrant when the third digit is a 1, the amplitude of the cosine signal (FIG. 4b) is compared to a fixed reference signal, sin 22½°; and if its amplitude exceeds this signal, a 1 is produced. This code is illustrated in FIG. 4e and represented by the following logic:

$$\sin \phi > \cos \phi \text{ and}$$

$$|K_1^2 \cos \phi| < K_1^2 \sin 22\ 1/2° \text{ then } 0$$

$$|K_1^2 \cos \phi| > K_1^2 \sin 22\ 1/2° \text{ then } 1.$$

By the same process of amplitude comparison, still additional bits or digits of the code can be produced employing the tangent or contangent functions of the phase angle:

$$K_1^2 \sin \phi / K_1^2 \cos \phi = \tan \phi \ K_1^2 \cos \phi / K_1^2 \sin \phi = \cot \phi$$

Where the third bit is 0 covering the range or sectors of phase angles from 0 to 45°, 135° to 180°, 0° − 45°, or −135° to −180°, it can be shown that the amplitude of the tangent function varies rapidly over this angular sector and the space direction of the incoming wave with this sector is determinable by comparing the amplitude of the tangent function to a fixed amplitude reference signal proportional to tan 22½°.

Similarly to obtain a still additional resolution of the wave within an 11¼° sector of phase angles $\phi$, the amplitude of the tangent function can be compared to a fixed reference signal proportional to tan 11½° and tan 37.75° and succeeding bits or digits of the code are thereby produced.

Briefly summarizing the manner of obtaining the digital code representing space direction, initially the signals from antennas 10 and 11 are processed to provide the cos $\phi$ signal and the sin $\phi$ signals of FIGS. 4b and 4a. As previously explained in FIGS. 4a and 4b these signals vary in amplitude and sign according to the cosine and sine of the phase angle $\phi$ which in turn, is proportional to the space direction or angle $\theta$ of the wave.

To determine a first or wide space sector of the incoming wave, the polarity of the sine signal, FIG. 4a, is used to produce the first digit of the binary code, and the polarity of the cosine signal to used to obtain the second digit of the code. The combined first and second digits together define the spatial direction of the incoming wave 12 within a broad angular sector in space.

The third digit of the code is produced by comparing the absolute amplitude of the cos $\phi$ signal to the absolute amplitude of the sin $\phi$ signal. As best illustrated by FIG. 4c, this digit resolves the direction of the incoming wave within a narrower spaced sector by effectively dividing the space sector obtained from the first and second digits in half.

A fourth digit of the code defining the space sector of the incoming wave in a still narrower space sector is obtained by comparing the amplitude of the sin $\phi$ and cos $\phi$ signals with a fixed reference amplitude. This reference amplitude is proportional to a phase angle being in the center of the previously determined space sectors. Both the sine and cosine signals are used for producing this fourth digit.

As an alternative, a fourth digit, and even higher order digits, are obtainable by employing a ratio comparison of sine and cosine functions according to the tangent and cotangent relationships.

By the combination of digits produced, or the multi-digit code, the spatial direction $\theta$ of the incoming wave is successively resolved within narrower and narrower space sectors. As discussed in the earlier filed application of Charles Fink et al., referred to above, additional pairs of more widely spaced antennas may be employed as a supplement to further define and resolve the incoming direction of the wave if desired.

Figure 7:
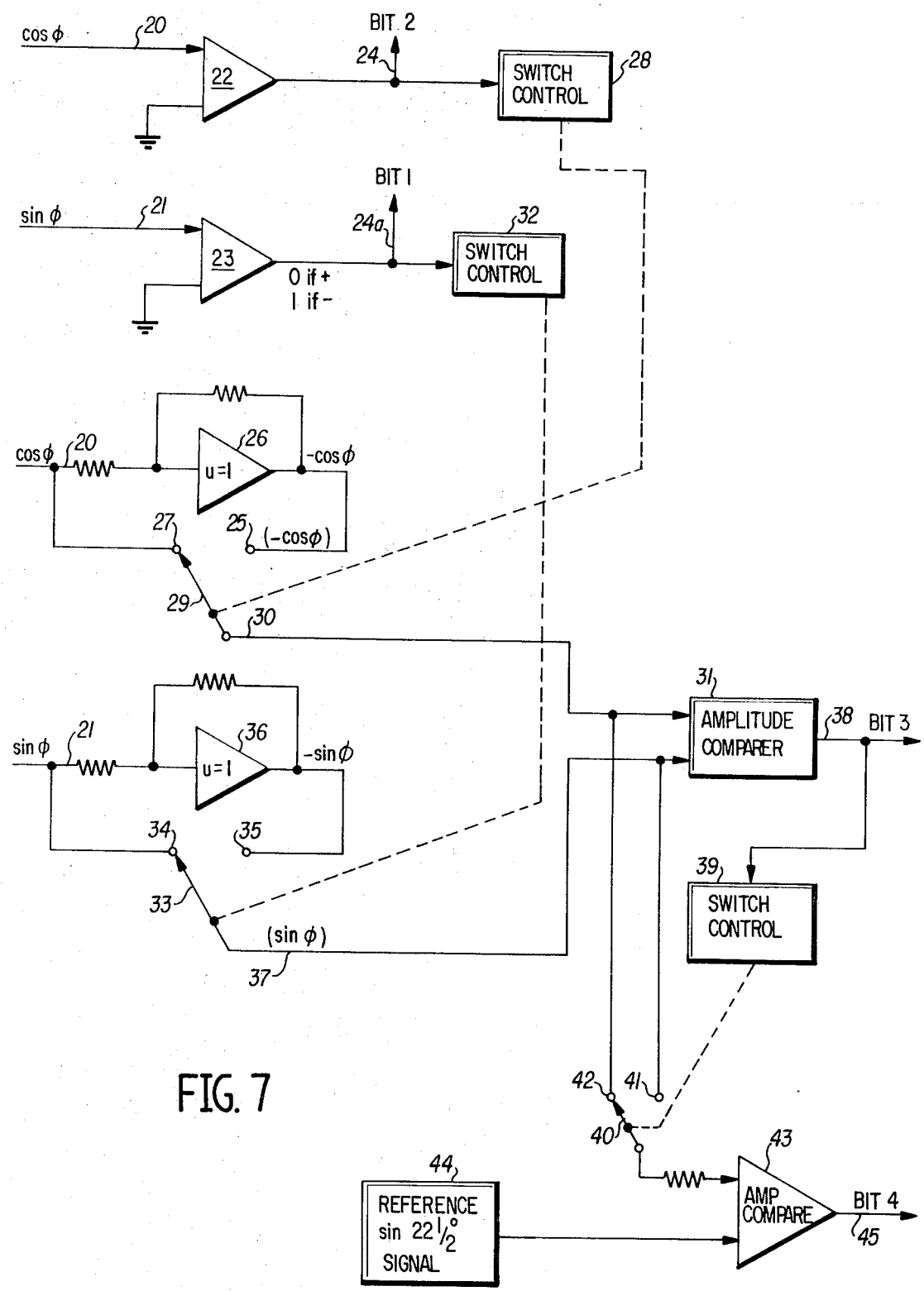
FIG. 7 is a block diagram illustrating a digitally operating system employing the processed signals of FIG. 5 to derive a digital code representing the direction of the incoming wave.

FIG. 7 is a block diagram of a system for implementing the logic of the present invention.

For producing the first and the second digits of the code, the cos $\phi$ signal on line 20 is applied to operational amplifier 22, and the sin $\phi$ signal on line 21 is amplifier 23. Where the output of amplifier 22 is positive, a 0 digit is produced over line 24, and where negative, a 1 digit is produced. Similarly where the output of amplifier 23 is positive a 0 is produced and where the signal is negative a 1 bit is produced over out put line 24a.

For obtaining the third digit, (by comparing the absolute amplitudes), only the positive signals for the sin and cos signals are compared. The cos $\phi$ signal is applied over line 20 to operational amplifier 26 having a gain of 1 and an opposite polarity on line 25 as compared to the same polarity output on line 27. Where the cos $\phi$ signal is of negative polarity, the switch control unit 28 responds to the bit 1 (being negative) to position the movable contact 29 toward fixed contact to line 25. This reverses the polarity of the negative cos signal on line 30 leading to amplitude comparator 31. On the other hand where the bit is a 0, or the signal of cos $\phi$ is positive, then the switch control 28 positions movable contactor 29 into fixed contact 27, and the positive cos $\phi$ signal is again directed to amplitude comparator 31. Thus regardless of the polarity of cos $\phi$, a positive cosine signal is always directed to amplitude comparator 31.

In a similar manner, the sin $\phi$ signal obtained from the output of amplifier 23 is appled to a switch control 32 that positions a movable contact 33 at either the input contact 34 or output contact 35 of amplifier 36 to always obtain a positive sin $\phi$ output signal over line 37 leading to amplitude comparator 31.

At amplitude comparator 31, a 0 bit or 1 bit is produced depending upon that one of the sin or cos signals that is greater than the other, and this third bit is produced over output line 38.

It will be recalled that the fourth bit is obtained by subdividing the space sector defined by the third bit. Thus when the third bit is 0, the fourth bit is obtained by determining whether the absolute amplitude of the sin signal exceeds or is less than a reference signal proportional to sin 22½° (FIG. 4a). On the other hand when the third bit is 1, the fourth bit is determined by comparing the absolute amplitude of the cos $\phi$ function with the fixed reference signal and producing a 0 or 1 bit depending upon the larger of the two functions.

To perform this logic function, a switch control 39 responds to the output of amplitude comparator 31 to position movable contact 40 to either fixed contact 41 when the third digit bit is 0 (cos $\phi$ exceeds sin $\phi$), or positions movable contact 40 to fixed contact 42 where the third bit is 1.

At contact 41, the absolute amplitude of the sin signal on line 37 is applied to amplitude comparator 43 where it is compared to a fixed reference signal produced by source 44. Where the sin φ is less than the reference, a 0 bit is produced on output line 45 and where sin φ exceeds the reference, a 1 bit is provided. In a similar manner, where the third bit is 1, then switch control 39 positions contact 40 to fixed contact 42, thereby applying the positive cos φ signal on line 30 to amplitude comparator 43. Where the cos φ signal exceeds the reference signal a 1 is produced and where the reference exceeds the cos φ signal a 0 is produced.

To obtain even further resolution of the space angle, the tan φ signal and cot φ signal are applied to a divider circuit (not shown). These signals are thence compared in amplitude to fixed reference signals in a manner similar to that described for the sin φ and cos φ signals to derive further successive bits defining the space direction of the radio wave.

Figure 5:
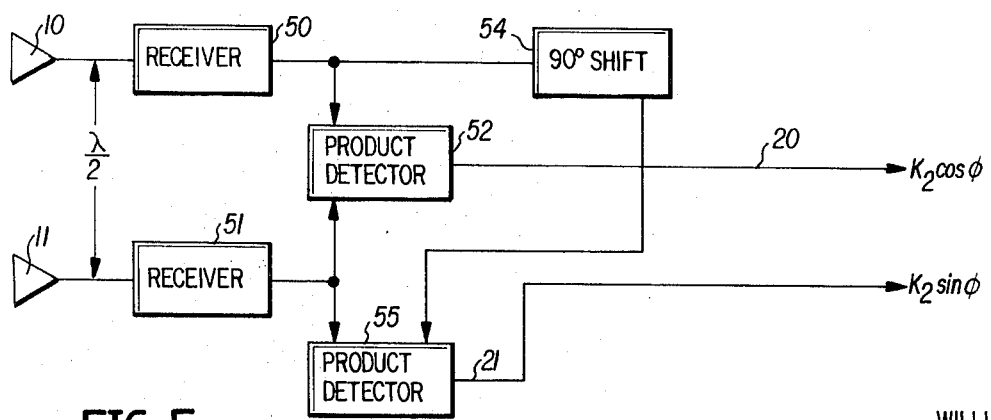
FIG. 5 is an electrical block diagram showing a product detector circuit for deriving the processed signals.

FIG. 5 illustrates in block diagram form a preferred circuit for producing the cosine signal and the sine signal.

As shown, the antenna signals from antennas 10 and 11 are initially amplified by receivers 50 and 51 and then applied to a product detector 52. As will be described in FIG. 6, the product detector 52 directly produced the cos signal over line 20.

For generating the sin φ signal the detected signal from antenna 10 is directed to a fixed phase shift shifter 54 where the signal is fixedly shifted by 90°. It is then applied to a second product detector 55 where the detected signal from antenna 11 is also applied. The resulting signal on line 21 is proportional to the sine signal.

Figure 6:
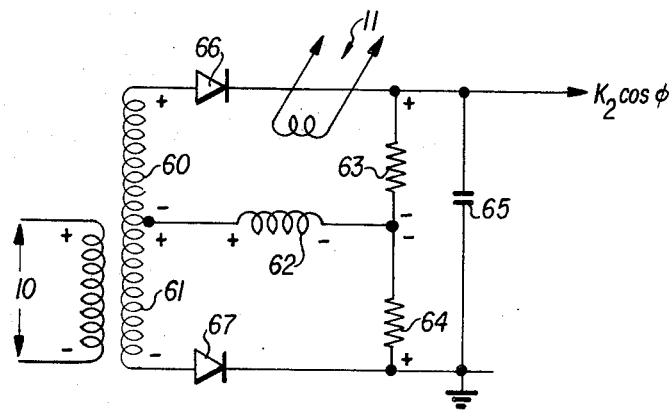
FIG. 6 is a schematic electrical circuit diagram of a product detector circuits.

A conventional type of product detector circuit that may be employed is shown in FIG. 6. The circuit employs a first transformer having center taped secondary windings 60 and 61 for receiving the signal from antenna 10, and a second transformer having a secondary winding 62 in series circuit with the center tap of secondaries 60 and 61 and forming a bridge circuit therewith. As will be seen from the plus and minus polarity markings at the ends of the transformer secondary windings, whenever the voltage of secondary 62 has an in phase component in additive relationship to the voltage on secondary winding 60, it is at that same time in subtractive relationship to the voltage on secondary 61. The upper diode 66 permits current flow through bridge resistor 63 only in the polarity or direction shown.

In a similar manner the lower diode 67 permits current flow through resistor 64 only in the direction shown. As is also observed, the polarity of the resulting signals across resistors 63 and 64 are in opposition to one another. Consequently, the resulting output signal developed across output capacitor 65 is proportional to the squared sum signal minus the squared difference signal as is desired. Any quadrature component of signal 10 is cancelled and accordingly the output obtained is the dot product of the two signals yielding the cosine signal as discussed above.

Where the antenna 10 signal is phase shifted by 90° and then applied to the product detector 55 (FIGS. 5), the dot product is also obtained of the phase displaced vectors, thereby yielding the sine signal as discussed above.

An alternative manner of producing the sine and cosine signals is shown in FIG. 3. Here the high frequency antenna signals 10 and 11 are applied to a conventional hybrid network to obtain the sum of these signals over line 66 and the difference thereof over line 67. Both signals are each then applied to square law detectors 68 and 69 respectively to square that signal, e.g., sum$^2$ and difference$^2$. The resulting squared signals are then subtracted from one another by difference amplifier 70 to yield a resulting signal over line 71 proportional to the cos φ as discussed above.

In a similar manner, the sin φ signal is produced by first phase shifting antenna 10 signal by 90° in shifter 72. Thereafter quadrature sum and difference signals are obtained in hybrid 73; the signals squared in detectors 74 and 75; and finally the difference thereof is obtained from difference amplifier 76.

It will be appreciated by those skilled in the art that many variations may be made in the system and circuits as described without departing from the spirit and scope of this invention. Accordingly this invention should be considered as being limited only by the following claims:

What is claimed is:

1. In a digital direction finding system, a pair of spaced apart antennas, means deriving squared sum and squared difference signals from said antennas and producing a digit of the code representing the greater amplitude between the squared sum and squared difference signals, means deriving phase shifted squared sum and squared difference signals from said antennas where an output of one antenna is shifted in phase by a fixed displacement, and producing another digit of said code representing the greater amplitude between the phase shifted squared sum and squared difference signals, means comparing the absolute amplitude of the squared sum minus squared difference signals with the absolute amplitude of the squared sum minus squared difference phase displaced signals and producing an additional digit of the code representing the greater of the absolute amplitudes, and means producing an additional lower digit of the code by comparing the smaller of said absolute amplitudes with a preset fixed amplitude reference signal.

2. In a digital direction finding system, a pair of spaced apart antennas, means deriving squared sum and squared difference signals from said antennas and producing a digit of the code representing the greater amplitude between the squared sum and squared difference signals, means deriving phase shifted squared sum and squared difference signals from said antennas, where an output of one antenna is shifted in phase by a fixed displacement, and producing another digit of said code representing the greater amplitude between the phase shifted squared sum and squared difference signals, and means comparing the absolute amplitude of the squared sum minus squared difference signals with the absolute amplitude of the squared sum minus squared difference phase displaced signals and producing an additional digit of the code representing the greater of the absolute amplitudes, and means deriving the ratio signal between said first mentioned difference signal and said second mentioned difference signal and producing succeeding digits representing the greater of the amplitudes of said ratio signal and fixed reference signals.

3. In a digital direction finding system, a pair of spaced apart antennas, a first product detector energized by said antennas for deriving a signal proportional to the cosine of the phase angle displacement between the antenna signals, a fixed phase shifter and second product detector energized by said antennas for deriving a signal proportional to the sine of the phase angle, means responsive to the amplitude, polarity, and relative amplitudes of the sine and cosine signals for producing a digital code representative of the spatial direction of a radio wave referenced to said antennas, said means including means for comparing the amplitudes of the sine and cosine signals to fixed amplitude reference signals to produce lower order digits of said code.

4. In a digital direction finding system, a pair of spaced apart antennas, a first product detector energized by said antennas for deriving a signal proportional to the cosine of the phase angle displacement between the antenna signals, a fixed phase shifter and second product detector energized by said antennas for deriving a signal proportional to the sine of the phase angle, means responsive to the amplitude, polarity, and relative amplitudes of the sine and cosine signals for producing a digital code respresentative of the spatial direction of a radio wave referenced to said antennas, said means including means for producing signals proportional to the tangent and cotangent of the phase angle difference.

5. In the system of claim 4, means comprising the amplitude of said tangent and cotangent signals with reference signals to produce still further lower order digits in the code.

6. In a digital direction finding system employing a pair of spaced apart antennas, means deriving a pair of signals proportional to the sine and cosine of the phase angle displacement between antenna signals, logic means for processing said signals to produce a miltidigit code including means for comparing the absolute amplitudes of the sine and cosine signals and responsive to the smaller of the signals to compare the smaller signal with a preset fixed amplitude reference to produce a lower order digit of the code.

7. In the system of claim 6, means responsive to the sine and cosine signal to derive a signal proportional to the tangent, and means for comparing the tangent to a fixed amplitude signal to derive an additional digit.

* * * * *